(12) United States Patent
Fu et al.

(10) Patent No.: US 11,429,383 B2
(45) Date of Patent: Aug. 30, 2022

(54) METHOD, DEVICE, AND PROGRAM PRODUCT FOR MANAGING DEVELOPMENT JOB IN DEVELOPMENT ENVIRONMENT

(71) Applicant: EMC IP Holding Company LLC, Hopkinton, MA (US)

(72) Inventors: Weijia Fu, Chengdu Sichuan (CN); Jun Zhao, Wangcang (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 16/930,991

(22) Filed: Jul. 16, 2020

(65) Prior Publication Data
US 2021/0173643 A1 Jun. 10, 2021

(30) Foreign Application Priority Data

Dec. 9, 2019 (CN) .......................... 201911250848.9

(51) Int. Cl.
*G06F 9/44* (2018.01)
*G06F 8/77* (2018.01)
(Continued)

(52) U.S. Cl.
CPC .................. *G06F 8/77* (2013.01); *G06F 8/41* (2013.01); *G06F 8/54* (2013.01); *G06Q 10/103* (2013.01);
(Continued)

(58) Field of Classification Search
CPC ....................................................... G06F 8/77
(Continued)

(56) References Cited

U.S. PATENT DOCUMENTS 8,245,192 B1 * 8/2012 Chen .......................... G06F 8/71
717/122
8,856,169 B2 * 10/2014 Zhang ..................... G06F 21/30
706/50

(Continued)

OTHER PUBLICATIONS

Kshitija Shinde et al. "Template-Based Code Generation Framework for Data-Driven Software Development"; 4th Intl Conf on Applied Computing and Information Technology/3rd Intl Conf on Computational Science/Intelligenceand Applied Informatics/1st Intl Conf on Big Data, Cloud Computing, Data Science & Engineer—2016.*

(Continued)

*Primary Examiner* — Francisco J Aponte
(74) *Attorney, Agent, or Firm* — BainwoodHuang

(57) ABSTRACT

Techniques involve determining a job template for executing a development job in the development environment and obtaining configuration information associated with the development job. The configuration information defines a development environment user preference for a configuration parameter. A development job instance is generated based on the job template and the configuration parameter. The development job instance is executed on code from the user to build an image for executing an application program. Rather than write code, developers may generate a development job instance including the desired configuration parameter by modifying the configuration information. Such techniques improve working efficiency of developers and maintain a common development template for use by developers. Such a technique may improve operation by imposing consistent storage application control.

20 Claims, 9 Drawing Sheets

(51) Int. Cl.
    *G06F 8/41*     (2018.01)
    *G06Q 10/10*     (2012.01)
    *G06F 8/54*     (2018.01)
    *G06F 11/36*     (2006.01)

(52) U.S. Cl.
    CPC ........ *G06F 11/362* (2013.01); *G06F 11/3684* (2013.01)

(58) Field of Classification Search
    USPC ....................................................... 717/101
    See application file for complete search history.

(56) References Cited

U.S. PATENT DOCUMENTS

| | | | |
|---|---|---|---|
| 9,250,893 | B2 | 2/2016 | Blahaerath et al. |
| 9,898,393 | B2 | 2/2018 | Moorthi et al. |
| 10,048,960 | B2* | 8/2018 | Cawley .............. G06F 11/3624 |
| 10,083,027 | B2* | 9/2018 | Moorthi .................... G06F 8/71 |
| 10,216,512 | B1* | 2/2019 | Mathew .................... G06F 8/41 |
| 10,496,402 | B1* | 12/2019 | Avrilingi .................... G06F 8/77 |
| 10,515,005 | B1* | 12/2019 | Burrell .................. G06F 11/368 |
| 10,684,851 | B2* | 6/2020 | Burli ...................... G06N 20/00 |
| 10,691,450 | B2* | 6/2020 | Jose .......................... G06F 8/60 |
| 11,023,427 | B2* | 6/2021 | Seriy .................. G06F 16/1873 |
| 2014/0143756 | A1* | 5/2014 | Liang ........................ G06F 8/70 717/120 |
| 2014/0289697 | A1* | 9/2014 | Wenda ................... G06Q 10/06 717/102 |
| 2016/0259631 | A1* | 9/2016 | Jing .......................... G06F 8/71 |
| 2016/0283222 | A1* | 9/2016 | Yaros ........................ G06F 8/34 |
| 2016/0364212 | A1* | 12/2016 | Mohaban .............. H04L 67/327 |
| 2017/0010889 | A1* | 1/2017 | Spektor ................... G06F 11/36 |
| 2017/0255454 | A1* | 9/2017 | Hassine .............. H04L 41/0813 |
| 2018/0024814 | A1* | 1/2018 | Ouali .................. G06F 11/3688 717/105 |
| 2018/0129483 | A1* | 5/2018 | Biddle .................... G06Q 10/06 |
| 2018/0129497 | A1* | 5/2018 | Biddle ................ G06F 11/3636 |
| 2018/0157466 | A1* | 6/2018 | Jubran ...................... G06F 8/00 |
| 2018/0196731 | A1* | 7/2018 | Moorthi .............. G06F 11/3664 |
| 2018/0293158 | A1* | 10/2018 | Baughman ................ G06F 8/77 |
| 2018/0329693 | A1* | 11/2018 | Eksten .................... G06F 16/21 |
| 2019/0042233 | A1* | 2/2019 | Majumdar ................ G06F 8/24 |
| 2019/0317754 | A1* | 10/2019 | Mosquera ........ G06Q 10/06316 |
| 2020/0089485 | A1* | 3/2020 | Sobran ...................... G06F 8/65 |
| 2020/0104125 | A1* | 4/2020 | Pechacek .................. G06F 8/24 |
| 2020/0110693 | A1* | 4/2020 | Herrin .................... G06N 20/00 |
| 2020/0192638 | A1* | 6/2020 | Pezaris .................... G06F 8/41 |
| 2020/0241872 | A1* | 7/2020 | Muddakkagari ...... G06F 16/903 |
| 2021/0004226 | A1* | 1/2021 | Gungabeesoon ..... G06F 8/4452 |

OTHER PUBLICATIONS

Kshitija Shinde et al. "Template-Based Code Generation Framework for Data-Driven Software Development"; 2016 4th Intl Conf on Applied Computing and Information Technology/3rd Intl Conf on Computational Science/Intelligence and Applied Informatics/1st Intl Conf on Big Data, Cloud Computing, Data Science & Engineer.*

* cited by examiner

METHOD, DEVICE, AND PROGRAM PRODUCT FOR MANAGING DEVELOPMENT JOB IN DEVELOPMENT ENVIRONMENT

CROSS-REFERENCE TO RELATED APPLICATION

This application claims priority to Chinese Patent Application No. CN201911250848.9, on file at the China National Intellectual Property Administration (CNIPA), having a filing date of Dec. 9, 2019, and having "METHOD, DEVICE, AND PROGRAM PRODUCT FOR MANAGING DEVELOPMENT JOB IN DEVELOPMENT ENVIRONMENT" as a title, the contents and teachings of which are herein incorporated by reference in their entirety.

FIELD

Various implementations of the present disclosure relate to the field of software development, and more specifically, to a method, device and computer program product for managing a development job in a software development environment.

BACKGROUND

With the development of computer technology, software development projects are becoming increasingly larger in scale and require a large number of developers to work in collaboration. Each developer may be responsible for a part of the functionality in the project, and codes from a plurality of developers may be integrated into the project. As the complexity of software development projects becomes more complex and the number of developers increases, a focus of research has become a way for integrating codes from many developers and ensuring that the whole software development project is correctly built and tested.

SUMMARY

Therefore, it is desirable to develop and implement a technical solution for managing a development job in a development environment more effectively. It is desired that the technical solution be compatible with existing development environments, and by reconstructing configurations of the existing development environments, a development job may be effectively managed in the development environment.

According to a first aspect of the present disclosure, a method is provided for managing a development job in a development environment. In the method, a job template for executing a development job in the development environment is determined. Configuration information associated with the development job is obtained, the configuration information defining a preference of a user of the development environment for a configuration parameter of executing the development job. A development job instance is generated based on the job template and the configuration parameter defined in the configuration information. The development job instance is executed on a code set from the user to build an image for executing an application program.

According to a second aspect of the present disclosure, an electronic device is provided, the electronic device including: at least one processor; and a memory coupled to the at least one processor, the memory having instructions stored thereon, the instructions, when executed by the at least one processor, causing the device to perform acts for managing a development job in a development environment. The acts include: determining a job template for executing a development job in the development environment; obtaining configuration information associated with the development job, the configuration information defining a preference of a user of the development environment for a configuration parameter of executing the development job; generating a development job instance based on the job template and the configuration parameter defined in the configuration information; and executing the development job instance on a code set from the user to build an image for executing an application program.

According to a third aspect of the present disclosure, a computer program product is provided. The computer program product is tangibly stored on a non-transitory computer-readable medium and includes machine-executable instructions which are used to implement a method according to the first aspect of the present disclosure.

BRIEF DESCRIPTION OF THE DRAWINGS

Through a more detailed description in the accompanying drawings, features, advantages and other aspects of the implementations for the present disclosure will become more apparent. Several implementations of the present disclosure are illustrated schematically and are not intended to limit the present invention. In the drawings.

DETAILED DESCRIPTION OF IMPLEMENTATIONS

Figure 1:
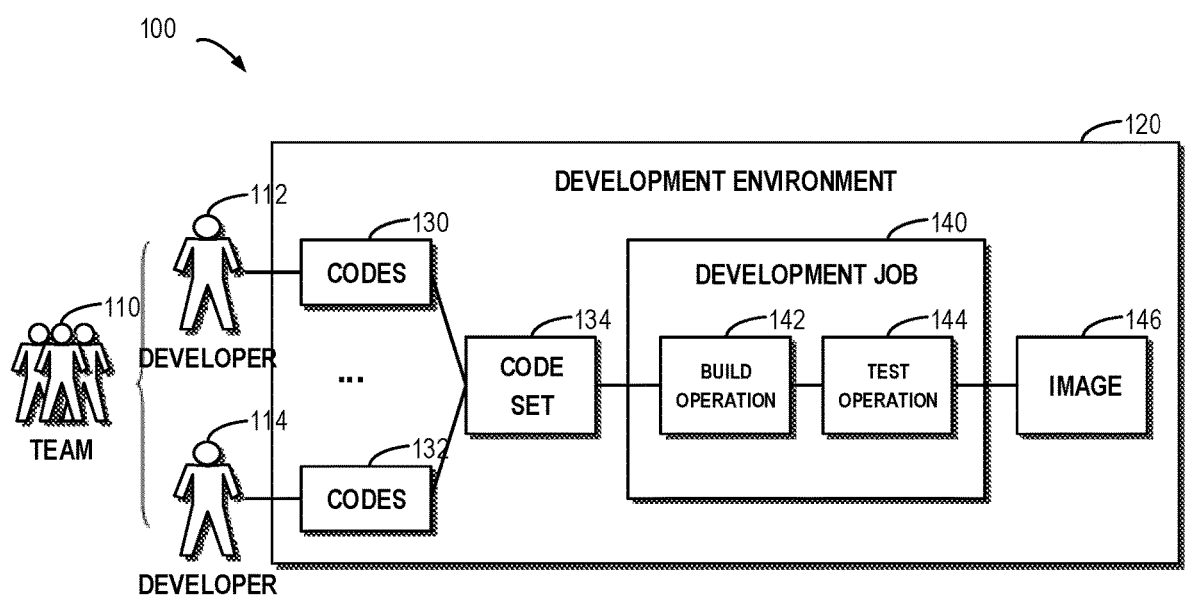
FIG. 1 schematically shows a block diagram of a development environment in which schematic implementations of the present disclosure may be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

The preferred implementations of the present disclosure will be described in more detail with reference to the drawings. Although the drawings illustrate the preferred implementations of the present disclosure, it should be appreciated that the present disclosure can be implemented in various ways and should not be limited to the implementations explained herein. On the contrary, the implementations are provided to make the present disclosure more thorough and complete and to fully convey the scope of the present disclosure to those skilled in the art.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The terms "one example implementation" and "one implementation" are to be read as "at least one example implementation." The term "a further implementation" is to be read as "at least a further implementation." The terms "first", "second" and so on can refer to same or different objects. The following text can also include other explicit and implicit definitions.

Software development environments have been proposed to support continuous integration and continuous delivery. A plurality of developers may commit their respective codes to the software development environment, in which a development job (e.g., may include one or more of compiling, testing and releasing) may be created based on received codes. It will be understood that different software development projects have different demands, and different development teams have their respective development habits. In general, there might be a plurality of development teams in a software development company, and each development team may be responsible for a sub-system in a software product. At this point, different software development teams need to create respective development jobs for integrating codes from a plurality of developers in the team.

First, description is presented to a development environment for software development with reference to FIG. 1. This figure schematically shows a block diagram 100 of a development environment 120 in which schematic implementations of the present disclosure may be implemented. As depicted, a team 110 may include developers 112, . . . , and 114, each of them may write his/her own codes. For example, the developer 112 may write codes 130, . . . , and the developer 114 may write codes 132. A code set 134 may be generated using the codes 130, . . . , and 132.

A development job 140 may be performed based on the code set 134, so as to generate an image 146 for executing an application program. The development job 140 may include, for example, a build operation 142 and a test operation 144. Here, the build operation 142 refers to the procedure for compiling and building the code set 134 to generate an executable program, and the test operation 144 refers to the procedure for testing the generated executable program to generate an image 146 that meets development needs and may execute the application program.

A main function of the development job 140 is to build a software product, but there might be different needs in different stages of the development. For example, in a continuous integration stage, it is necessary to build a debug version and conduct a unit test, and a sanity test or official signing is not required. In another example, in a build stage for the project, there is a need to build both debug and retail versions, skip a unit test (since the unit test has been completed in the continuous integration stage) and conduct a sanity test, while official signing is not required. In still another example, in a release build stage, it is necessary to build both debug and retail versions and conduct a unit test, a sanity test is required with more test cases, official signing is required, and furthermore a virus scan on generated images is required.

Figure 2:
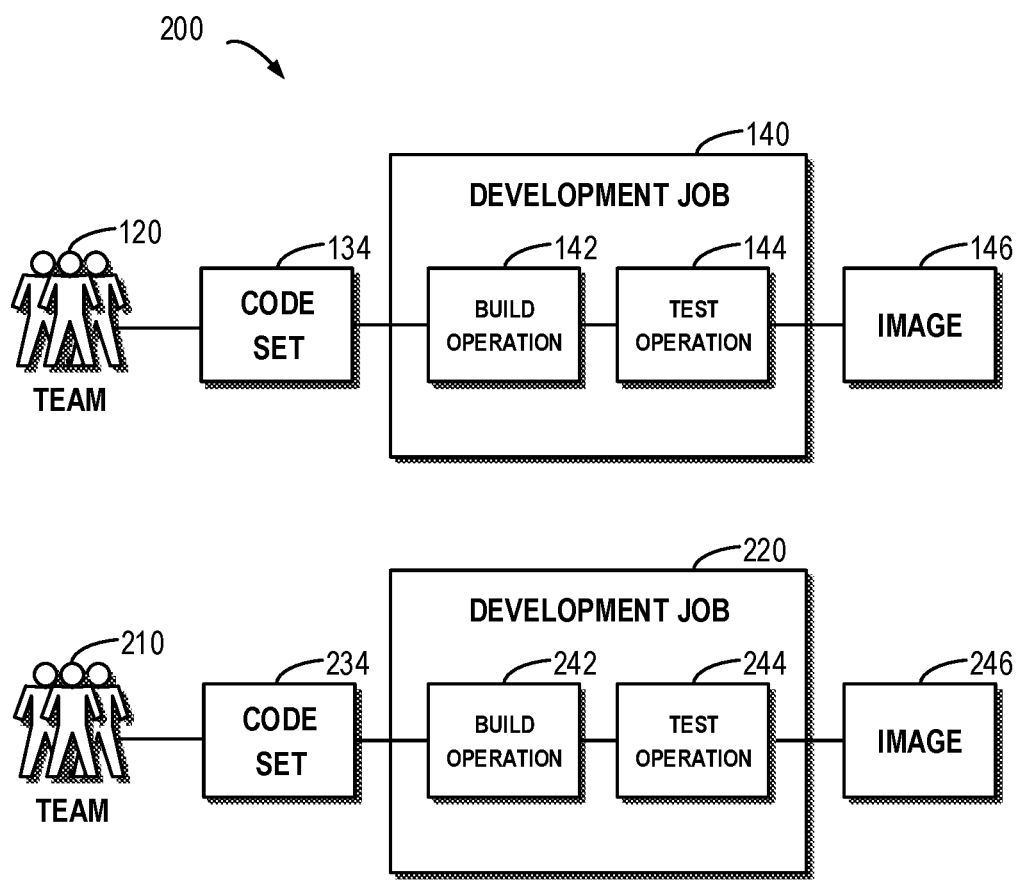
FIG. 2 schematically shows a block diagram for managing a development job according to one technical solution.

Technical solutions have been proposed to manage development jobs. Specifically, FIG. 2 schematically shows a block diagram 200 for managing a development job according to one technical solution. As depicted, a software company may include a plurality of teams 120 and 210, and each team may be responsible for developing different modules (or components) in an application program. For example, the team 120 may generate a code set 134, create a development job 140 to perform a build operation 142 and a test operation 144 on the code set 134, and further generate an image 146. In addition, the team 210 may generate a code set 234, create a development job 220 to perform a build operation 242 and a test operation 244 on the code set 234, and further generate an image 246.

It will be understood that although both the development jobs include a build operation and a test operation, specific configuration parameters in each operation may be totally different. Since the development jobs 140 and 220 of the two teams use different configuration parameters to perform different procedures, developers in these teams have to write their respective development jobs 140 and 220 for performing different functions. Thereby, developers not only need to write codes in the code sets 134 and 234 but also need to write and maintain codes related to the development jobs 140 and 220 of their own teams, which will result in a lot of manpower and time overhead. Furthermore, the development jobs 140 and 220 of the various teams might include some identical needs. As a result, the various teams have difficulty in sharing contents written for the same needs, and it is also difficult for the software company to provide unified support for the various teams.

Figure 3:
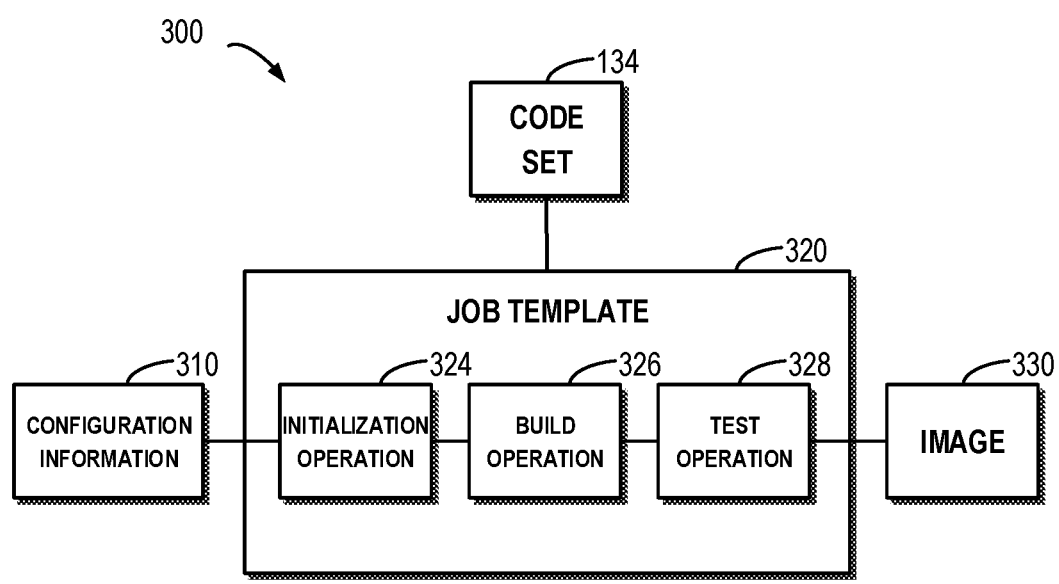
FIG. 3 schematically shows a block diagram of the procedure for managing a development job in a development environment according to example implementations of the present disclosure.

To at least partly solve the above problems, schematic implementations of the present disclosure propose a job template and configuration information. A brief description is presented on how to manage a development job with reference to FIG. 3. This figure schematically shows a block diagram 300 of the procedure for managing a development job in a development environment according to example implementations of the present disclosure. As depicted, a job template 320 may be provided, which may be similar to the main function for the starting software functionality. The job template may define entrances of various operations of performing the development job. For example, the job template 320 may include an initialization operation 324, a build operation 326 and a test operation 328.

Furthermore, configuration information 310 may be provided, which may define a preference of a user of the development environment for configuration parameters of performing the development job. At this point, related configuration parameters in the job template 320 may be modified based on the configuration information 310, so as to generate the development job that meets requirements of the configuration information 310. Then, the code set 134 may be processed using the generated development job, so that an image 330 that meets requirements of the configuration information 310 may be generated.

Specifically, different configuration information may define different contents. One piece of configuration information may define: it is necessary to build a test version and conduct a unit test, while a sanity test or official signing is not required. Another piece of configuration information may define: it is necessary to build both debug and retail versions, skip a unit test and conduct a sanity test, while official signing is not required. With example implementations of the present disclosure, it is unnecessary to generate respective development jobs for building and debugging respective code sets, but a desired development job may be obtained and a desired image may be generated simply by modifying the configuration information 310. More details about schematic implementations of the present disclosure will be described with reference to FIG. 4 below.

Figure 4:
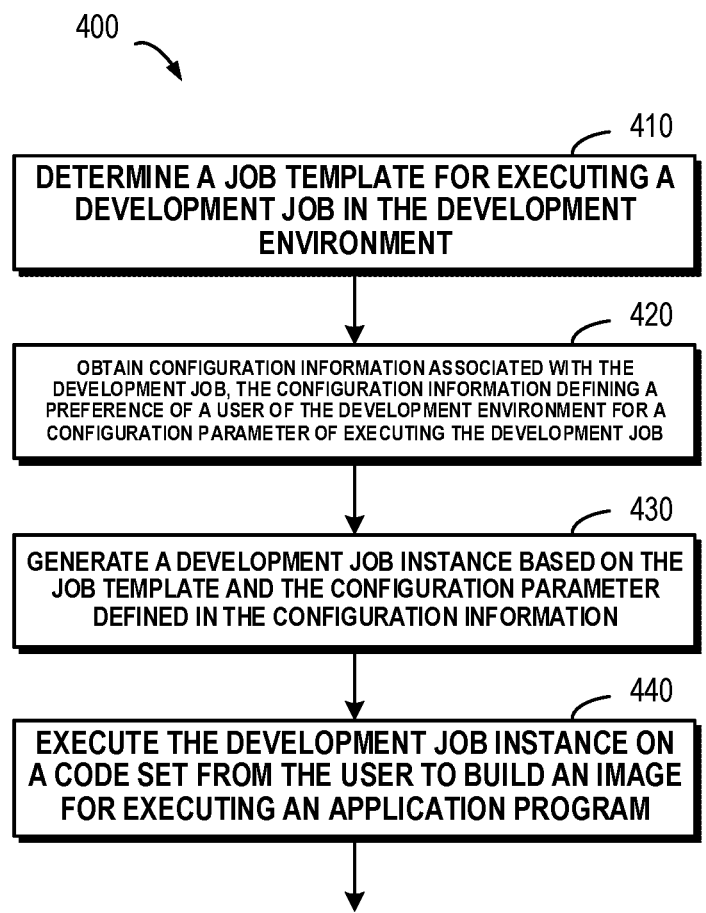
FIG. 4 schematically shows a flowchart of a method for managing a development job in a development environment according to example implementations of the present disclosure.

FIG. 4 schematically shows a flowchart of a method 400 for managing a development job in a development environment according to example implementations of the present disclosure. At block 410, a job template 320 for executing a development job in the development environment may be determined. Here the job template 320 may include a portion which may be shared among a plurality of development jobs, for example, may include entrances for calling various operations related to a development job. Table 1 schematically shows one example of the job template.

TABLE 1

Example of Job Template

@Library("build-libraries@integration") _
import com.emc.common.TridentCommonUtils
envVars.injectConfig( )
utils = new TridentCommonUtils(this)
node('master'){
  try{
    timestamps{
      timeout(30) { tridentStages.initialize(utils) }
      timeout(540) { tridentStages.build(utils) }
      timeout(30) { tridentStages.test(utils) }
    }
    // tell Jenkins the build is passed
    currentBuild.result = 'SUCCESS'
  } catch(Exception ex) {
    currentBuild.result = 'FAILURE'
    println ex
  } finally {
    utils.tearDown( )
  }
}

As denoted by the code line @Library ("build-libraries@integration") in Table 1, the job template 320 may include information of a library involved in processing the code set. In another example, the job template may include: the code line "tridentStages.initialize(utils)" for an initialization operation, the code line "tridentStages.build(utils)" for a build operation, and the code line "tridentStages.test (utils)" for a test operation, etc.

It will be understood that Table 1 is merely one example of the job template. According to example implementations of the present disclosure, the job template 320 may include more or less code lines. For example, it is possible that the job template 320 does not include the code line for loading a link library, but the portion related to loading the link library may be provided in the configuration information 310. At this point, an example of the job template 320 may be as shown in Table 2 below.

TABLE 2

Example of Job Template envVars.injectConfig( )
utils = new TridentCommonUtils(this)
node('master'){
  try{
    timestamps{
      timeout(30) { tridentStages.initialize(utils) }
      timeout(540) { tridentStages.build(utils) }
      timeout(30) { tridentStages.test(utils) }
    }
    // tell Jenkins the build is passed
    currentBuild.result = 'SUCCESS'
  } catch(Exception ex) {
    currentBuild.result = 'FAILURE'
    println ex
  } finally {
    utils.tearDown( )
  }
}

Figure 5:
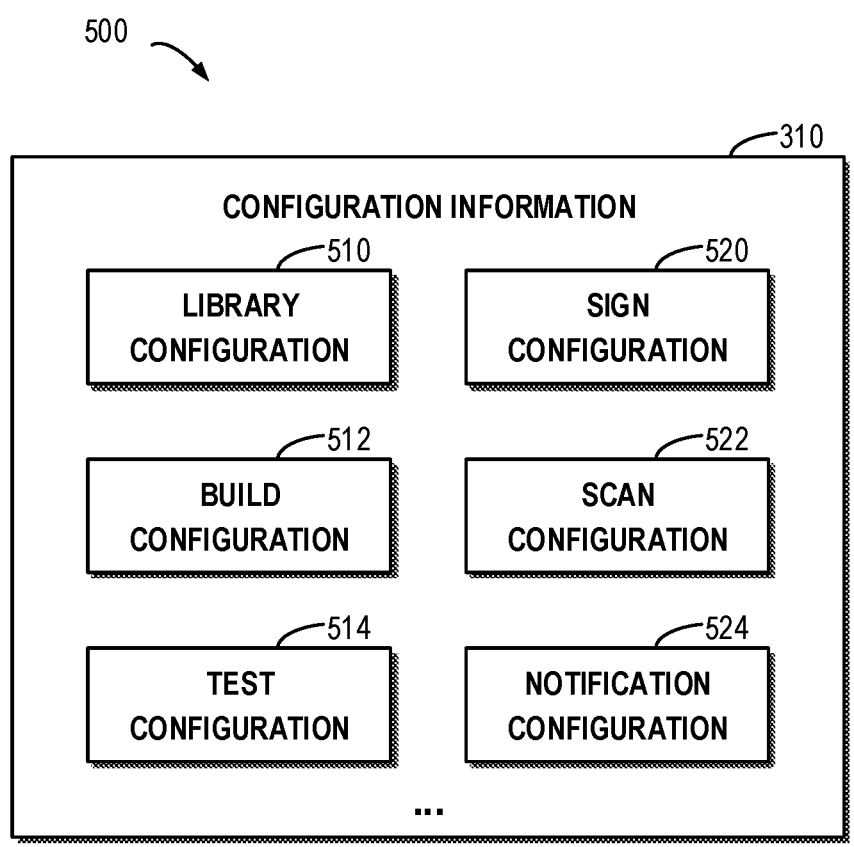
FIG. 5 schematically shows a block diagram of a structure of configuration information according to example implementations of the present disclosure.

At block 420, the configuration information 310 associated with the development job may be obtained. According to example implementations of the present disclosure, the configuration information 310 may define a preference of a user of the development environment for a configuration parameter of executing the development job. Here, the configuration parameter may include various contents, which will be described with reference to FIG. 5. This figure schematically shows a block diagram 500 of a structure of the configuration information according to example implementations of the present disclosure. As depicted, the configuration information 310 may include library configuration 510, build configuration 512, test configuration 520, sign configuration 520, scan configuration 522, . . . , and notification configuration 524.

According to example implementations of the present disclosure, the library configuration 510 indicates one or more link libraries based on which the code set 134 is compiled and run. For example, the library configuration 510 may be set using an identifier of a link library. Continuing the above example, the library configuration 510 may be set as "build-libraries@integration," for example. A developer may edit the library configuration 510 according to a link library on which the code set 134 depends. First, a link library called by codes in the code set 134 may be determined, and subsequently the library configuration 510 in the configuration information may be set based on an identifier of the link library. With example implementations of the present disclosure, teams do not have to write codes related to calling a link library in the development job, but may specify a link library, which is desired to be called, simply by modifying the configuration information.

Figure 6:
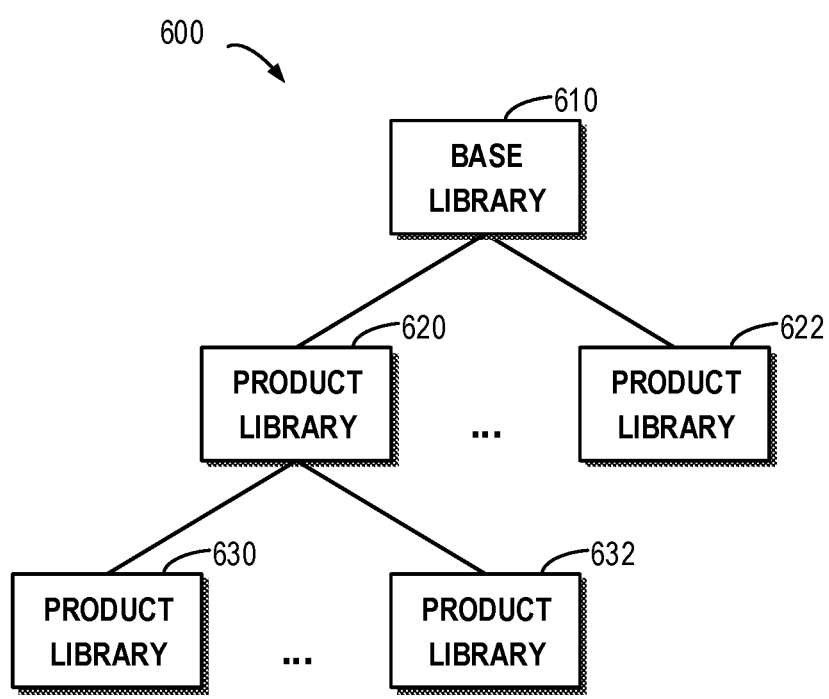
FIG. 6 schematically shows a block diagram of dependencies between link libraries according to example implementations of the present disclosure.

It will be understood that for the software company, different teams may be responsible for different functional modules (or units) of the application program, at which point different functional modules may also depend on different link libraries. FIG. 6 schematically shows a block diagram 600 of dependencies between link libraries according to example implementations of the present disclosure. As depicted, developers may first develop a base library 610.

For example, regarding a software company that provides storage application programs, the base library 610 may include basic functions related to data storage. During subsequent development, developers of various teams may call contents in the base library 610.

The software company may provide various products: database products based on centralized storage and database products based on distributed storage. At this point, developers may further extend functions of the base library 610 so as to develop product libraries that are suitable for different storage application program products: a product library 620 for database products based on centralized storage, a product library 622 for database products based on distributed storage, etc. Furthermore, functions of each product library may be continuously extended so as to provide product libraries 630, . . . , and 632 for supporting more products.

According to example implementations of the present disclosure, a link library may be determined according to a product category to which the code set 134 belongs, and information on the link library may be written to the configuration information 310. For example, a code set developed by one team includes codes related to centralized databases, and then the loading of the product library 620 for centralized databases may be specified in the configuration information 310. In another example, a code set developed by another team includes codes related to distributed databases, and then the loading of the product library 622 for distributed libraries may be specified in the configuration information 310. With example implementations of the present disclosure, in the subsequent development process, teams for developing different products may conveniently specify a link library on which the code set depends.

According to example implementations of the present disclosure, the configuration parameter may include a build type 512. Here, the build type 512 may include at least one of: a debug type and a retail type. It will be understood that the debug type includes debug information about debugging the code set, and the debug information records intermediate states of various parameters in the code set during debugging to help developers to find and correct errors in the code set. The retail type does not include the debug information. By editing the configuration information 310, developers may conveniently modify the build type so as to generate images in different versions.

For the sake of description, Table 3 schematically shows one example of the configuration information 310.

TABLE 3

Example of Configuration Information default:
    CFG_ISSUE_LABELS: Integration Queue
    CFG_SLACK_CHANNEL: trident_release_build
    CFG_DEVUTILS_PATH:
/net/c4shares.sspg.lab.emc.com/c4shares/auto/devutils
    # gradle options
    CFG_LOCAL_EXTRA_OPTS:    --parallel
-Dorg.gradle.caching.debug=true
    CFG_GW_OPTIONS: --rerun-tasks
    CFG_CACHE_PUSH: true
    CFG_CACHE_LOCAL: false
    # build required
    CFG_JENKINS_JOB_TYPE: orchestration
    DEVOPS_TRIGGER_TYPE: PDR
    CIT_TEST: 0
    CFG_BUILD_MODE: local
    DISTRIBUTION_TYPE: ENGINEERING
    CFG_SUPPORT_FLAVORS: DEBUG,RETAIL
    # Switches TABLE 3-continued Example of Configuration Information CFG_CIT_QUEUE_ENABLE: false
    CFG_CITaaS_ENABLE: false
    CFG_VIRUS_SCAN_ENABLE: false
    CFG_ONDEMAND_ENABLE: false
    CFG_CONSOLE_VERBOSE_ENABLE: false
    CFG_SLACK_NOTIFY_ENABLE: false
    # Testing
    CITDockerImageTag:
afeoscyc-mw.cec.lab.emc.com/test/cactuscycloneantpoc
    DEVOPS_ANT_QUEUE: 10.244.172.67
    CIT_QUEUE_ID: 15132
    CIT_DEFAULT_ASSIGNEE: latha.krishnan@emc.com
trident-RTM-build:
    DISTRIBUTION_TYPE: RTM
    CFG_POOL_NAME: DMv2_RTM
    CFG_CIT_QUEUE_ENABLE: true
    CFG_VIRUS_SCAN_ENABLE: true
    CFG_SLACK_NOTIFY_ENABLE: true
trident-BETA-build:
    DISTRIBUTION_TYPE: BETA
    CFG_POOL_NAME: DMv2_BETA
    CFG_CIT_QUEUE_ENABLE: true
    CFG_VIRUS_SCAN_ENABLE: true
    CFG_SLACK_NOTIFY_ENABLE: true
trident-ENG-build:
    CFG_POOL_NAME: DMv2_ENGINEERING
    CFG_CIT_QUEUE_ENABLE: true
    CFG_SLACK_NOTIFY_ENABLE: true
trident-integration-build:
    CFG_POOL_NAME: DMv2_INTEGRATION
    CFG_CITaaS_ENABLE: true
    CFG_GW_OPTIONS: "
    CFG_SLACK_NOTIFY_ENABLE: true
trident-FeatureIntegration-build:
    CFG_POOL_NAME: DMv2_INTEGRATION
    CFG_GW_OPTIONS: "
    CFG_ONDEMAND_ENABLE: true
    CFG_SLACK_NOTIFY_ENABLE: true According to example implementations of the present disclosure, the configuration parameter may include a test type 514. Here, the test type 514 may include at least one of: a unit test and a sanity test. The unit test refers to a test for correctness verification on one unit module in the code set, and the sanity test refers to a test as to whether the code set can accomplish desired functions. It will be understood that illustrated herein are only two examples of the test type, and according to example implementations of the present disclosure, the configuration parameter may include more or less test types. Further, the configuration information may specify a test case for performing a test. In the example of Table 3, the keyword "CFG_CITaaS_ENABLE" defines configuration related to test enabling/disabling.

With example implementations of the present disclosure, by editing the configuration information 310, developers may conveniently perform different types of tests on the code set and further guarantee the stability and reliability of the final application program.

According to example implementations of the present disclosure, the configuration parameter may include sign configuration 520, for specifying whether official signing needs to be performed on a built image. Generally, official signing is not required during internal development and testing. When the code set has passed various tests and is about to be released, official signing may be performed on the built image. With example implementations of the present disclosure, developers may conveniently control signatures of the image by editing the configuration information 310. For example, developers may quickly switch and generate an image with or without a signature.

According to example implementations of the present disclosure, the configuration parameter may include scan configuration 522, for specifying whether a virus scan needs to be performed on the built image. Generally, a virus scan on images is not required during internal development and testing. When the code set has passed various tests and is about to be released, a virus scan may be performed on the built image. In the example of Table 3, the keyword "CFG_VIRUS_SCAN_ENABLE" defines the configuration related to the test enabling/disabling. With example implementations of the present disclosure, developers may conveniently control virus scans by editing the configuration information 310. For example, during development, developers may disable the virus scan function to reduce the processing time and improve the development efficiency. After completion of development and testing, developers may enable the virus scan function to guarantee the security of the retail version.

According to example implementations of the present disclosure, the configuration parameter may include notification configuration 524, for specifying a recipient that receives a build report of the image. In the example of Table 3, the keyword "CFG_SLACK_NOTIFY_ENABLE" defines the configuration related to the test enabling/disabling. A channel for receiving the build report may be specified. For example, a mail list and/or a list of instant message recipients may be defined, and the built report may be sent to a specified recipient. With example implementations of the present disclosure, by modifying the configuration information 310, developers may conveniently specify persons to which the build report will be sent.

Returning to FIG. 4, at block 430, a development job instance may be generated based on the job template 320 and the configuration parameter defined in the configuration information. Specifically, a variable associated with the configuration parameter may be identified in the job template 320. In the above example, the variable "slackNotify" in the job template 320 is used to indicate whether the build report is sent to a recipient, and the configuration parameter "CFG_SLACK_NOTIFY_ENABLE" in the configuration information 310 defines whether the build report is sent. At this point, a value of the variable "slackNotify" in the job template 320 may be updated based on the configuration parameter. If the configuration information 310 defines "CFG_SLACK_NOTIFY_ENABLE=true," then "slackNotify=true" may be set;
  otherwise "slackNotify=false" may be set.

According to example implementations of the present disclosure, an injection function may be defined for performing the operation at block 430. For example, the configuration parameter defined in the configuration information 310 may be injected into the job template based on the function "envVars.injectConfig( )" in Table 1 and Table 2.

Figure 7:
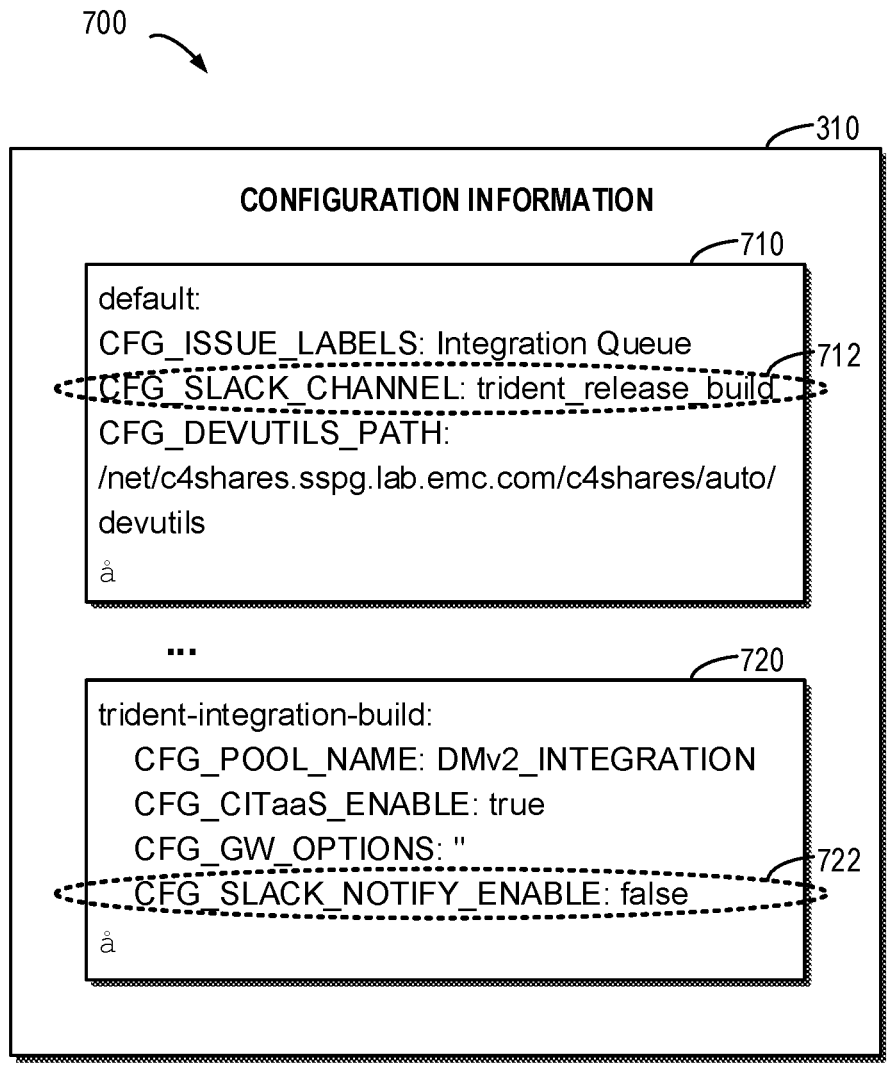
FIG. 7 schematically shows a block diagram of default configuration and custom configuration which are comprised in configuration information according to example implementations of the present disclosure.

According to example implementations of the present disclosure, the configuration information 310 may further include default configuration and custom configuration. FIG. 7 schematically shows a block diagram 700 of default configuration 710 and custom configuration 720 comprised in the configuration information 310 according to example implementations of the present disclosure. As depicted, the configuration information 310 may include the default configuration 710 and the custom configuration 720. The two types of parameters may have different priorities, and the development job instance may be generated based on the default configuration 710 when the custom configuration 720 is not specified. If the custom configuration 720 is specified, then the job development instance may be generated based on the custom configuration 720.

According to example implementations of the present disclosure, the configuration information 310 may include a group of default configuration parameters 710. While generating the development job, if a received generation request for generating the development job instance does not specify which custom configuration is used, then the group of default configuration parameters may be used to generate the development job instance. With reference to FIG. 7, the default configuration 710 is used where no custom configuration is specified. As defined by a code line 712, the build report is sent to a group of predefined recipients "trident release build."

According to example implementations of the present disclosure, the configuration information 310 may include a group of custom configuration parameters 720. As shown in FIG. 7, the custom parameter 720 is indicated with the identifier "trident-integration-build." While generating the development job, if the generation request includes the identifier "trident-integration-build" specifying a group of configuration parameters, then the group of custom configuration parameters 720 corresponding to the identifier may be used to generate the development job instance. At this point, since a code line 722 defines a disabled notification, the code line 722 in the custom configuration 720 will overwrite the code line 712 in the default configuration 710.

Returning to FIG. 4, at block 440, the development job instance may be executed on the code set 134 from the user, to build an image for executing an application program. Since a development job instance has been generated at block 430, at this point, an image 330 for executing an application program may be obtained by running the generated development instance. With example implementations of the present disclosure, developers do not need to write different development jobs in different stages of the development. Instead, by modifying the configuration parameter in the configuration information 310, development jobs that are suitable for different teams, different products and different development stages may be automatically generated based on the job template 320, and furthermore corresponding images 330 may be generated.

According to example implementations of the present disclosure, a solution is further provided for modifying the configuration parameter in the configuration information 310 via a command. Specifically, in a call request for calling the development job instance, developers may set a configuration parameter with a higher priority through a keyword, so as to overwrite contents in the configuration information 310. Specifically, a keyword for updating the configuration parameter may be determined from the call request. The keyword may involve various aspects which may be included in the above configuration information 310, e.g., may include one or more of the library configuration 510, the build configuration 512, the test configuration 514, the sign configuration 529, the scan configuration 522, . . . , and the notification configuration 524.

Figure 8:
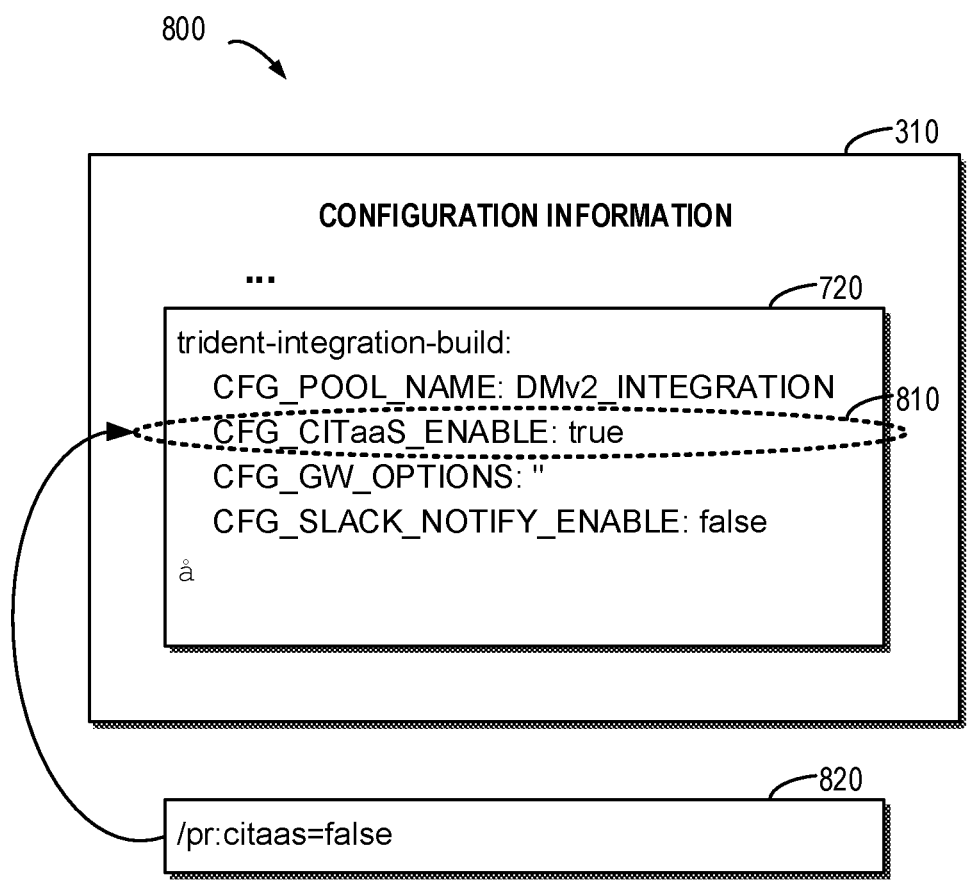
FIG. 8 schematically shows a block diagram of updating a configuration parameter in configuration information based on a call request according to example implementations of the present disclosure.

FIG. 8 schematically shows a block diagram 800 for updating the configuration parameter in the configuration information based on a call request. As depicted, the code line 810 in the custom configuration 720 may specify that a sanity test is enabled. Developers may update the code line 810 via a command 820, so as to disable the sanity test. In another example, the command "/pr:flavor=retail" may set the build type as the retail type; the command "/pr:utest=false" may disable a unit test; the command "/pr:citaas=false" may disable a sanity test. With example implementations of the present disclosure, the configuration parameter in the configuration information 310 may be overwritten by a command line.

While examples of the method according to the present disclosure have been described in detail with reference to FIGS. 2 to 8, description is presented below to the implementation of a corresponding apparatus. According to example implementations of the present disclosure, an apparatus is provided for managing a development job in a development environment. The apparatus includes: a determining module configured to determine a job template for executing a development job in the development environment; an obtaining module configured to obtain configuration information associated with the development job, the configuration information defining a preference of a user of the development environment for a configuration parameter of executing the development job; a generating module configured to generate a development job instance based on the job template and the configuration parameter defined in the configuration information; and a building module configured to execute the development job instance on a code set from the user to build an image for executing an application program.

According to example implementations of the present disclosure, the generating module includes: an identifying module configured to identify in the job template a variable associated with the configuration parameter; and an updating module configured to update a value of the variable based on the configuration parameter.

According to example implementations of the present disclosure, the obtaining module includes: a library determining module configured to determine a link library on which the code set depends; and a setting module configured to set a configuration parameter in the configuration information based on an identifier of the link library.

According to example implementations of the present disclosure, the library determining module includes: a product determining module configured to determine the link library according to a product category to which the code set belongs.

According to example implementations of the present disclosure, the configuration parameter includes a build type, and the build type includes at least one of: a debug type and a retail type.

According to example implementations of the present disclosure, the configuration parameter includes a test type, and the test type includes at least one of: a unit test and a sanity test.

According to example implementations of the present disclosure, the configuration parameter includes at least one of: sign configuration for specifying whether official signing needs to be performed on a built image; scan configuration for specifying whether a virus scan needs to be performed on a built image; and notification configuration for specifying a recipient that receives a build report of the image.

According to example implementations of the present disclosure, the configuration information includes a group of default configuration parameters, and the generating module includes: a receiving module configured to receive a generation request for generating the development job instance; and a default instance generating module configured to use the group of default configuration parameters to generate the development job instance according to the generation request.

According to example implementations of the present disclosure, the configuration information includes a group of custom configuration parameters, and the generating module includes: a receiving module configured to receive a generation request for generating the development job instance; and a custom instance generating module configured to, in accordance with determining that the generation request includes an identifier specifying a group of configuration parameters, use a group of custom configuration parameters that correspond to the identifier to generate the development job instance.

According to example implementations of the present disclosure, the apparatus further includes: a calling module configured to receive a call request for calling the development job instance; a keyword determining module configured to determine from the call request a keyword for updating the configuration parameter; and a configuration updating module configured to update the configuration parameter based on information associated with the keyword in the call request.

Figure 9:
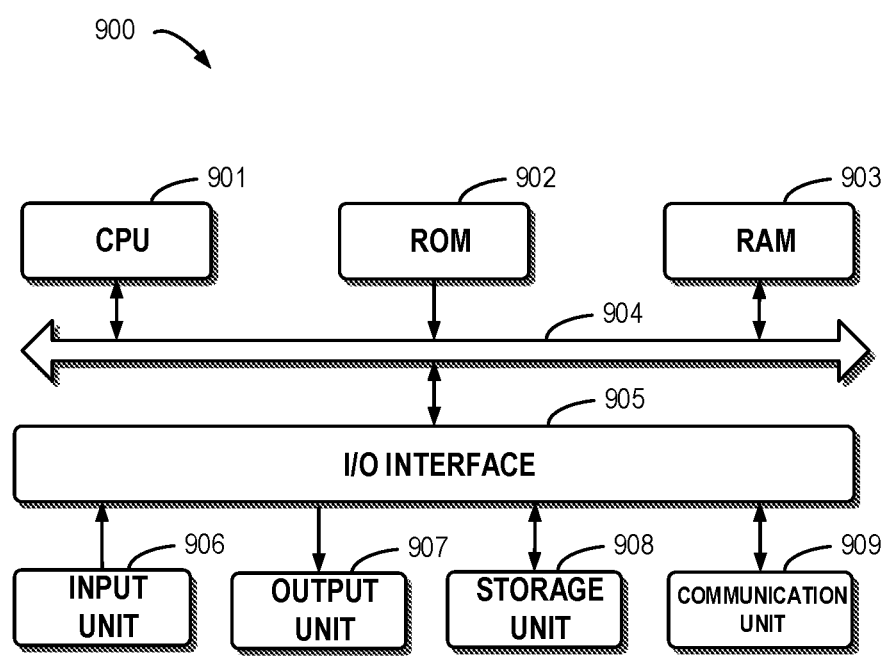
FIG. 9 schematically shows a block diagram of a device for managing a development job in a development environment according to example implementations of the present disclosure.

FIG. 9 schematically shows a block diagram of a device 900 for managing a development job in a development environment according to example implementations of the present disclosure. As depicted, the device 900 includes a central processing unit (CPU) 901, which can execute various suitable actions and processing based on the computer program instructions stored in the read-only memory (ROM) 902 or computer program instructions loaded in the random-access memory (RAM) 903 from a storage unit 908. The RAM 903 can also store all kinds of programs and data required by the operations of the device 900. CPU 901, ROM 902 and RAM 903 are connected to each other via a bus 904. The input/output (I/O) interface 905 is also connected to the bus 904.

A plurality of components in the device 900 are connected to the I/O interface 905, including: an input unit 906, such as a keyboard, mouse and the like; an output unit 907, e.g., various kinds of displays and loudspeakers etc.; a storage unit 908, such as a magnetic disk and optical disk, etc.; and a communication unit 909, such as a network card, modem, wireless transceiver and the like. The communication unit 909 allows the device 900 to exchange information/data with other devices via the computer network, such as Internet, and/or various telecommunication networks.

The above described process and treatment, such as the method 400 can also be executed by the processing unit 901. For example, in some implementations, the method 400 can be implemented as a computer software program tangibly included in the machine-readable medium, e.g., the storage unit 908. In some implementations, the computer program can be partially or fully loaded and/or mounted to the device 900 via ROM 902 and/or the communication unit 909. When the computer program is loaded to the RAM 903 and executed by the CPU 901, one or more steps of the above described method 400 can be implemented. Alternatively, in other implementations, the CPU 901 can also be configured in other suitable ways to realize the above procedure/method.

According to example implementations of the present disclosure, an electronic device is provided, the electronic device including: at least one processor; and a memory coupled to the at least one processor, the memory having instructions stored thereon, the instructions, when executed by the at least one processor, causing the device to perform acts for managing a development job in a development environment. The acts include: determining a job template for executing a development job in the development environment; obtaining configuration information associated with the development job, the configuration information defining a preference of a user of the development environment for a configuration parameter of executing the development job; generating a development job instance based on the job template and the configuration parameter defined in the configuration information; and executing the development job instance on a code set from the user so as to build an image for executing an application program.

According to example implementations of the present disclosure, generating the development job instance based on the job template and the configuration parameter defined in the configuration information includes: identifying in the job template a variable associated with the configuration parameter; and updating a value of the variable based on the configuration parameter.

According to example implementations of the present disclosure, obtaining the configuration information associated with the development job includes: determining a link library on which the code set depends; and setting a configuration parameter in the configuration information based on an identifier of the link library.

According to example implementations of the present disclosure, determining the link library on which the code set depends includes: determining the link library according to a product category to which the code set belongs.

According to example implementations of the present disclosure, the configuration parameter includes a build type, and the build type includes at least one of: a debug type and a retail type.

According to example implementations of the present disclosure, the configuration parameter includes a test type, and the test type includes at least one of: a unit test and a sanity test.

According to example implementations of the present disclosure, the configuration parameter includes at least one of: sign configuration for specifying whether official signing needs to be performed on a built image; scan configuration for specifying whether a virus scan needs to be performed on a built image; and notification configuration for specifying a recipient that receives a build report of the image.

According to example implementations of the present disclosure, the configuration information includes a group of default configuration parameters, and generating the development job instance includes: receiving a generation request for generating the development job instance; and using the group of default configuration parameters to generate the development job instance according to the generation request.

According to example implementations of the present disclosure, the configuration information includes a group of custom configuration parameters, and generating the development job instance includes: receiving a generation request for generating the development job instance; and in accordance with determining that the generation request includes an identifier specifying a group of configuration parameters, using a group of custom configuration parameters that correspond to the identifier to generate the development job instance.

According to example implementations of the present disclosure, the acts further include: receiving a call request for calling the development job instance; determining from the call request a keyword for updating the configuration parameter; and updating the configuration parameter based on information associated with the keyword in the call request.

According to example implementations of the present disclosure, there is provided a computer program product. The computer program product is tangibly stored on a non-transitory computer-readable medium and includes machine-executable instructions which are used to implement the method according to the present disclosure.

According to example implementations of the present disclosure, there is provided a computer-readable medium. The computer-readable medium has machine-executable instructions stored thereon, the machine-executable instructions, when executed by at least one processor, causing the at least one processor to implement the method according to the present disclosure.

The present disclosure can be a method, device, system and/or computer program product. The computer program product can include a computer-readable storage medium, on which the computer-readable program instructions for executing various aspects of the present disclosure are loaded.

The computer-readable storage medium can be a tangible apparatus that maintains and stores instructions utilized by the instruction executing apparatuses. The computer-readable storage medium can be, but is not limited to, an electrical storage device, magnetic storage device, optical storage device, electromagnetic storage device, semiconductor storage device or any appropriate combinations of the above. More concrete examples of the computer-readable storage media (non-exhaustive list) include: portable computer disk, hard disk, random-access memory (RAM), read-only memory (ROM), erasable programmable read-only memory (EPROM or flash), static random-access memory (SRAM), portable compact disk read-only memory (CD-ROM), digital versatile disk (DVD), memory stick, floppy disk, mechanical coding devices, punched card stored with instructions thereon, or a projection in a slot, and any appropriate combinations of the above. The computer-readable storage medium utilized here is not interpreted as transient signals per se, such as radio waves or freely propagated electromagnetic waves, electromagnetic waves propagated via waveguide or other transmission media (such as optical pulses via fiber-optic cables), or electric signals propagated via electric wires.

The described computer-readable program instruction can be downloaded from the computer-readable storage medium to each computing/processing device, or to an external computer or external storage via Internet, local area network, wide area network and/or wireless network. The network can include copper-transmitted cable, optical fiber transmission, wireless transmission, router, firewall, switch, network gate computer and/or edge server. The network adapter card or network interface in each computing/processing device receives computer-readable program instructions from the network and forwards the computer-readable program instructions for storage in the computer-readable storage medium of each computing/processing device.

The computer program instructions for executing operations of the present disclosure can be assembly instructions, instructions of instruction set architecture (ISA), machine instructions, machine-related instructions, microcodes, firmware instructions, state setting data, or source codes or target codes written in any combination of one or more programming languages, wherein the programming languages consist of object-oriented programming languages, e.g., Smalltalk, C++ and so on, and traditional procedural programming languages, such as "C" language or similar programming languages. The computer-readable program instructions can be implemented fully on the user computer, partially on the user computer, as an independent software package, partially on the user computer and partially on the remote computer, or completely on the remote computer or server. In the case where a remote computer is involved, the remote computer can be connected to the user computer via any type of network, including local area network (LAN) and wide area network (WAN), or to the external computer (e.g., connected via Internet using an Internet service provider). In some implementations, state information of the computer-readable program instructions is used to customize an electronic circuit, e.g., programmable logic circuit, field programmable gate array (FPGA) or programmable logic array (PLA). The electronic circuit can execute computer-readable program instructions to implement various aspects of the present disclosure.

Various aspects of the present disclosure are described here with reference to flow charts and/or block diagrams of method, apparatus (system) and computer program products according to implementations of the present disclosure. It should be understood that each block of the flow charts and/or block diagrams and the combination of various blocks in the flow charts and/or block diagrams can be implemented by computer-readable program instructions.

The computer-readable program instructions can be provided to the processing unit of a general-purpose computer, dedicated computer or other programmable data processing apparatuses to manufacture a machine, such that the instructions that, when executed by the processing unit of the computer or other programmable data processing apparatuses, generate an apparatus for implementing functions/actions stipulated in one or more blocks in the flow chart and/or block diagram. The computer-readable program instructions can also be stored in the computer-readable storage medium and cause the computer, programmable data processing apparatus and/or other devices to work in a particular way, such that the computer-readable medium stored with instructions contains an article of manufacture, including instructions for implementing various aspects of the functions/actions stipulated in one or more blocks of the flow chart and/or block diagram.

The computer-readable program instructions can also be loaded into a computer, other programmable data processing apparatuses or other devices, so as to execute a series of operation steps on the computer, the other programmable data processing apparatuses or other devices to generate a computer-implemented procedure. Therefore, the instructions executed on the computer, other programmable data processing apparatuses or other devices implement functions/actions stipulated in one or more blocks of the flow chart and/or block diagram.

The flow charts and block diagrams in the drawings illustrate system architecture, functions and operations that may be implemented by system, method and computer program products according to a plurality of implementations of the present disclosure. In this regard, each block in the flow chart or block diagram can represent a module, a part of program segment or code, wherein the module and the part of program segment or code include one or more executable instructions for performing stipulated logic functions. In some alternative implementations, it should be noted that the functions indicated in the block can also take place in an order different from the one indicated in the drawings. For example, two successive blocks can be in fact executed in parallel or sometimes in a reverse order depending on the functions involved. It should also be noted that each block in the block diagram and/or flow chart and combinations of the blocks in the block diagram and/or flow chart can be implemented by a hardware-based system exclusively for executing stipulated functions or actions, or by a combination of dedicated hardware and computer instructions.

Various implementations of the present disclosure have been described above and the above description is only by way of example rather than exhaustive and is not limited to the implementations of the present disclosure. Many modifications and alterations, without deviating from the scope and spirit of the explained various implementations, are obvious for those skilled in the art. The selection of terms in the text aims to best explain principles and actual applications of each implementation and technical improvements made in the market by each implementation, or enable others of ordinary skill in the art to understand implementations of the present disclosure.

We claim:

1. A method for managing a development job in a development environment, the method comprising:
    determining a job template for a development job to be performed in the development environment, the job template containing a build operation command and a variable for a build operation of the development job;
    obtaining configuration information associated with the development job, the configuration information defining a preference of a user of the development environment for a configuration parameter of executing the development job, the configuration parameter being associated with the variable;
    generating a development job instance based on the job template and the configuration parameter defined in the configuration information, the development job instance being generated to include (1) the build operation command from the job template and (2) a value of the variable according to the configuration parameter from the configuration information; and
    executing the development job instance on a code set from the user to build an image for executing an application program,
    wherein obtaining the configuration information associated with the development job comprises:
    determining a link library on which the code set depends; and
    setting a configuration parameter in the configuration information based on an identifier of the link library,
    and wherein determining the link library on which the code set depends comprises: determining the link library according to a product category to which the code set belongs.

2. The method of claim 1, wherein the configuration parameter comprises a build type, and the build type comprises at least one of: a debug type and a retail type.

3. The method of claim 1, wherein the configuration parameter comprises a test type, and the test type comprises at least one of: a unit test and a sanity test.

4. The method of claim 1, wherein the configuration parameter comprises at least one of:
    sign configuration for specifying whether official signing needs to be performed on a built image;
    scan configuration for specifying whether a virus scan needs to be performed on a built image; and
    notification configuration for specifying a recipient that receives a build report of the image.

5. The method of claim 1, wherein the configuration information comprises a group of default configuration parameters, and generating the development job instance comprises:
    receiving a generation request for generating the development job instance; and using the group of default configuration parameters to generate the development job instance according to the generation request.

6. The method of claim 1, wherein the configuration information comprises a group of custom configuration parameters, and generating the development job instance comprises:
receiving a generation request for generating the development job instance; and
in accordance with determining that the generation request comprises an identifier specifying a group of configuration parameters, using a group of custom configuration parameters that correspond to the identifier to generate the development job instance.

7. The method of claim 1, further comprising:
receiving a call request for calling the development job instance;
determining, from the call request, a keyword for updating the configuration parameter; and
updating the configuration parameter based on information associated with the keyword in the call request.

8. The method of claim 1, wherein:
the job template further contains a test operation command and a second variable for a test operation of the development job;
the configuration information further defines the preference of the user of the development environment for a second configuration parameter of executing the development job, the second configuration parameter being associated with the second variable; and
the development job instance is generated to further include (3) the test operation command from the job template, and (3) a second value of the second variable according to second configuration parameter from the configuration information.

9. The method of claim 1, wherein the job template further a configuration injection function referring to the configuration information, and wherein obtaining the configuration information includes executing the injection function of the job template to inject the configuration information into the development job instance.

10. An electronic device, comprising:
at least one processor; and
a memory coupled to the at least one processor, the memory having instructions stored thereon, the instructions, when executed by the at least one processor, causing the electronic device to implement acts for managing a development job in a development environment, the acts comprising:
determining a job template for a development job to be performed in the development environment, the job template containing a build operation command and a variable for a build operation of the development job;
obtaining configuration information associated with the development job, the configuration information defining a preference of a user of the development environment for a configuration parameter of executing the development job, the configuration parameter being associated with the variable;
generating a development job instance based on the job template and the configuration parameter defined in the configuration information, the development job instance being generated to include (1) the build operation command from the job template and (2) a value of the variable according to the configuration parameter from the configuration information; and
executing the development job instance on a code set from the user to build an image for executing an application program,
wherein obtaining the configuration information associated with the development job comprises:
determining a link library on which the code set depends; and
setting a configuration parameter in the configuration information based on an identifier of the link library,
and wherein determining the link library on which the code set depends comprises: determining the link library according to a product category to which the code set belongs.

11. The electronic device of claim 10, wherein the configuration parameter comprises a build type, and the build type comprises at least one of: a debug type and a retail type.

12. The electronic device of claim 10, wherein the configuration parameter comprises a test type, and the test type comprises at least one of: a unit test and a sanity test.

13. The electronic device of claim 10, wherein the configuration parameter comprises at least one of:
sign configuration for specifying whether official signing needs to be performed on a built image;
scan configuration for specifying whether a virus scan needs to be performed on a built image; and
notification configuration for specifying a recipient that receives a build report of the image.

14. The electronic device of claim 10, wherein the configuration information comprises a group of default configuration parameters, and generating the development job instance comprises:
receiving a generation request for generating the development job instance; and
using the group of default configuration parameters to generate the development job instance according to the generation request.

15. The electronic device of claim 10, wherein the configuration information comprises a group of custom configuration parameters, and generating the development job instance comprises:
receiving a generation request for generating the development job instance; and
in accordance with determining that the generation request comprises an identifier specifying a group of configuration parameters, using a group of custom configuration parameters that correspond to the identifier to generate the development job instance.

16. The electronic device of claim 10, wherein:
the job template further contains a test operation command and a second variable for a test operation of the development job;
the configuration information further defines the preference of the user of the development environment for a second configuration parameter of executing the development job, the second configuration parameter being associated with the second variable; and
the development job instance is generated to further include (3) the test operation command from the job template, and (3) a second value of the second variable according to second configuration parameter from the configuration information.

17. The electronic device of claim 10, wherein the job template further a configuration injection function referring to the configuration information, and wherein obtaining the configuration information includes executing the injection function of the job template to inject the configuration information into the development job instance.

18. A computer program product having a non-transitory computer readable medium which stores a set of instructions to manage a development job in a development environment; the set of instructions, when carried out by computerized circuitry, causing the computerized circuitry to perform a method of:
  determining a job template for a development job in the development environment, the job template containing a build operation command and a variable for a build operation of the development job;
  obtaining configuration information associated with the development job, the configuration information defining a preference of a user of the development environment for a configuration parameter of executing the development job, the configuration parameter being associated with the variable;
  generating a development job instance based on the job template and the configuration parameter defined in the configuration information, the development job instance being generated to include (1) the build operation command from the job template and (2) a value of the variable according to the configuration parameter from the configuration information; and
  executing the development job instance on a code set from the user to build an image for executing an application program,
  wherein obtaining the configuration information associated with the development job comprises:
  determining a link library on which the code set depends; and
  setting a configuration parameter in the configuration information based on an identifier of the link library,
  and wherein determining the link library on which the code set depends comprises: determining the link library according to a product category to which the code set belongs.

19. The computer program product of claim 18, wherein:
  the job template further contains a test operation command and a second variable for a test operation of the development job;
  the configuration information further defines the preference of the user of the development environment for a second configuration parameter of executing the development job, the second configuration parameter being associated with the second variable; and
  the development job instance is generated to further include (3) the test operation command from the job template, and (3) a second value of the second variable according to second configuration parameter from the configuration information.

20. The computer program product of claim 18, wherein the job template further a configuration injection function referring to the configuration information, and wherein obtaining the configuration information includes executing the injection function of the job template to inject the configuration information into the development job instance.

* * * * *